March 10, 1931.   F. O. JAQUES, JR   1,795,778
MICROMETER CALIPER
Filed June 15, 1928
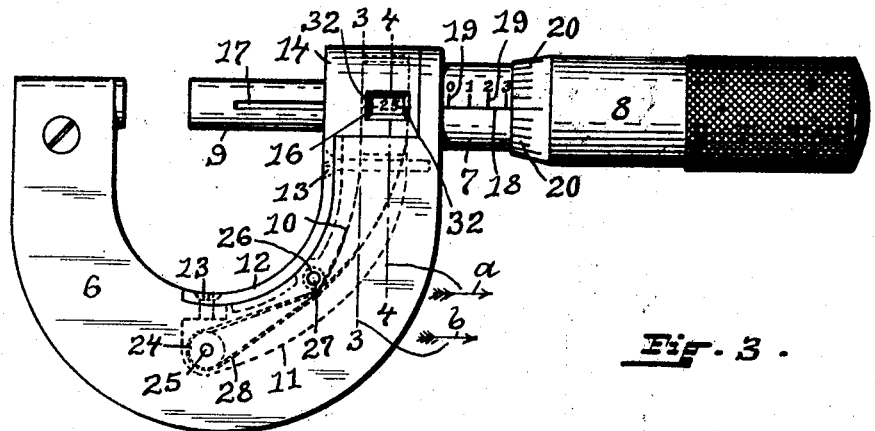
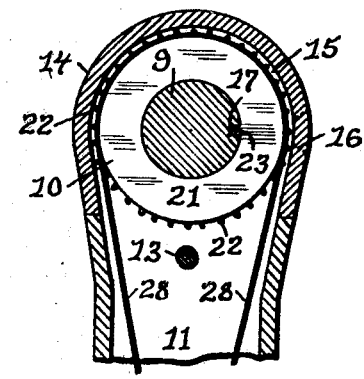
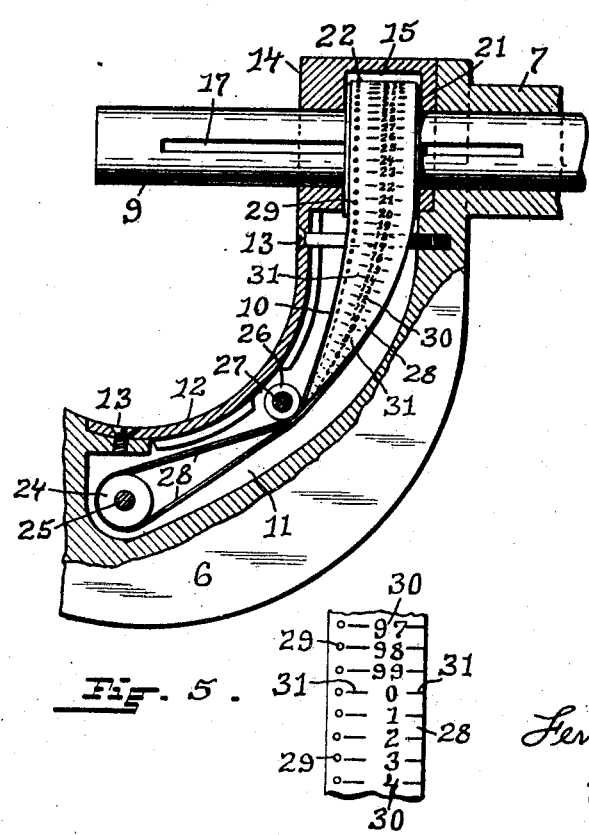
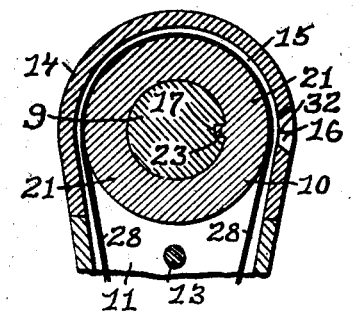
INVENTOR:
Fernando Oscar Jaques, Jr.,
By Chas. H. Luther
ATTORNEY:

Patented Mar. 10, 1931

1,795,778

UNITED STATES PATENT OFFICE

FERNANDO OSCAR JAQUES, JR., OF PROVIDENCE, RHODE ISLAND

MICROMETER CALIPER

Application filed June 15, 1928. Serial No. 285,536.

My invention has reference to an improvement in instruments of precision and more particularly to an improvement in that form of micrometer calipers known as easy reading micrometers.

In the usual form of easy reading micrometer calipers the construction is such, that there are too many parts to move in turning the spindle, thereby creating undue friction and wear in operating the micrometer.

The object of my invention is to produce an easy reading micrometer with the least number of movable parts, thereby simplifying and improving its construction and operation.

Another object of my invention is to produce an easy reading micrometer caliper having the usual U shaped handle, so long used and well liked by the users of these instruments, the U shaped handle inclosing the easy reading mechanism of the micrometer.

My invention consists in the peculiar and novel construction of an easy reading micrometer caliper, said easy reading micrometer caliper having details of construction as will be more fully set forth hereinafter and claimed.

Figure 1 is a side view of my improved easy reading micrometer caliper.

Figure 2 is an enlarged detail side handle view partly in section of the micrometer caliper.

Figure 3 is an enlarged detail transverse sectional view through the caliper taken on line 3, 3, of Figure 1 and showing the means for revolving the continuous indicating band.

Figure 4 is an enlarged detail sectional view similar to Figure 3, taken on line 4, 4, of Figure 1, through the sight opening, and Figure 5 is an enlarged face view of part of the continuous indicating band on which the numerals run continuously from 0 to 99.

In the drawing, 6 indicates the U shaped handle, 7, the barrel, 8, the thimble, 9, the spindle and 10, my improved easy reading measuring indicating mechanism of the instrument.

The handle 6, has a cavity 11, curved to conform with the handle 6. The cavity 11 is closed by a curved plate 12, secured to the handle 6, by screws 13, 13, the plate 12, having a fitting 14, through which the spindle 9 extends and which has a cavity 15, forming a continuation of the cavity 11, and a sight opening 16, as shown in Figures 1, 2 and 4. The spindle 9, has a longitudinal groove 17, and the barrel 7, has a longitudinal indicating line 18, and a series of right angle indicating lines 19, 19, numbered from 0 to 9, each indicating one hundred one thousandths of an inch. The indicating lines 20, 20, on the thimble 8, each indicate one thousandth of an inch, as usual. A pin pulley 21, in the cavity 15, has a continuous series of projecting pins 22, 22, and is operatively secured to the spindle 9, by a spline 23, in the spindle groove 17, as shown in Figure 4. An end roll 24, on a transverse shaft 25, is rotatably secured in the cavity 11, and an intermediate roll 26, on a transverse shaft 27, is also rotatably secured in the cavity 11, as shown in Figure 2. A continuous thin metal band 28, extends around the pin pulley 21, the end roll 24, and flattens out on the intermediate roll 26. This continuous band 28, has a continuous series of off side pin holes 29, through which the pins 22, 22, on the pin pulley 21, projects, a series of numerals 30, 30, reading from 0 to 99 on its face and a series of indicating lines 31, 31, on its face, one for each numeral 30, and coinciding with oppositely disposed longitudinal indicating lines 32, 32, on the edges of the sight opening 16, as shown in Figures 1, 2 and 5.

The operation of my improved easy reading micrometer caliper is as follows. The thimble 8, and spindle 9, may be turned in either direction. On revolving the spindle 9, to the left or right the pin pulley 21, is revolved with the spindle 9. This revolves the band 28, and rolls 24 and 26, thereby bringing the numerals 30, 30, on the band 28, under the sight opening 16. When the thimble 8, and spindle 9, have been revolved into the position, as shown in Figure 1, the reading is three hundred an twenty-five (325) one thousandth of an inch, and so on, the readings being taken from the last exposed numeral on the barrel 7, and then from the numeral on the band 28, through the sight opening 16. When the indicating lines 31,31, on the band 28, conicide with the indicating lines 32,32, on the sides of the sight opening 16, they also coincide with the longitudinal indicating line 18, on the barrel 7, and indicate that the reading is exactly on a thousandth of an inch.

By the peculiar and novel construction of my improved easy reading micrometer caliper, the easy reading mechanism is operatively secured in the handle without changing the desired U-shape of the handle.

Having thus described my invention I claim as new:—

1. A micrometer caliper comprising a U-shaped handle having a bore therethrough, a spindle extending through said bore, said handle being further formed with a cavity therein curved to conform to the shape thereof and a sight opening communicating with said bore, the cavity being in communication with the bore, a pin pulley operatively connected to the spindle, an end roll in the cavity, an intermediate roll in the cavity, a thin continuous metal band extending around the pin pulley and the end roll and guided by the intermediate roll, said band having indicating lines and numerals in a position to show in succession through the sight opening.

2. A micrometer caliper comprising a U-shaped handle having a bore therethrough, a spindle extending through said bore, said handle being further formed with a cavity therein curved to conform to the shape thereof and a sight opening communicating with said bore, the cavity being in communication with the bore, means carried by said spindle for driving an endless band, an end roll in the cavity, an intermediate roll in the cavity and an endless band extending around said end roll and guided by said intermediate roll, said band being driven by the driving means carried by said spindle and having indicating numerals thereon which show through the sight opening.

3. A micrometer caliper comprising a U-shaped handle having a bore therethrough, a spindle extending through said bore, said handle being further provided with a cavity therein shaped to conform to the shape of the handle and communicating with said bore, means positioned in said cavity for supporting and guiding an endless band in such a manner that one transverse section of said band is located at an angle to another transverse section thereof, one of said means being carried by said spindle, and means for driving said endless band from said spindle carried means, said endless band being provided with indicia for indicating the extent of movement of said spindle relative to said handle.

4. A micrometer caliper comprising a U-shaped handle having a sight opening with indicating lines on its edge, a spindle extending through the handle, and walls forming a curved cavity within the handle, an end roll in the cavity, an intermediate roll in the cavity, a thin metal band extending around the end roll and guided by the intermediate roll, said band having indicating numerals which show through the sight opening and indicating lines thereon adapted to cooperate with the indicating lines at the sight opening, and means for operatively connecting the band with the spindle.

5. A micrometer caliper comprising a U-shaped handle having a bore therethrough and provided with a cavity curved to conform substantially to the shape of said handle and communicating with said bore, a spindle movably mounted in said bore, an endless indicating band operatively connected with said spindle and extending therearound, and supporting and guiding rolls positioned in said cavity for supporting and guiding said indicating band, one of said rolls having its axis angularly positioned relative to the axis of said spindle.

In testimony whereof, I have signed my name to this specification.

FERNANDO OSCAR JAQUES, Jr.